Sept. 19, 1933.  E. KAROLUS  1,927,748

COW POKE

Filed Sept. 19, 1932

Eugene Karolus, INVENTOR

BY Victor J. Evans & Co.

ATTORNEY

Patented Sept. 19, 1933

1,927,748

UNITED STATES PATENT OFFICE 1,927,748

COW POKE

Eugene Karolus, Harper, Kans.

Application September 19, 1932
Serial No. 633,904

1 Claim. (Cl. 119—139)

This invention relates to animal pokes, and its general object is to provide a device of that character, that when pressure is brought to bear against either the upper or lower ends thereof, when the animal attempts to jump or break through the enclosure, penetrating means are put into operation to prevent the animal from doing so, yet the device is otherwise comfortable and humane, in that it is light in weight and follows the shape and curvature of the animal's neck.

A further object of the invention is to provide an animal poke, that is operable under all conditions, is easy to apply, cannot become casually removed from the animal, is simple in construction, inexpensive to manufacture and extremely efficient in operation and serivce.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figures 1, 2, 3:
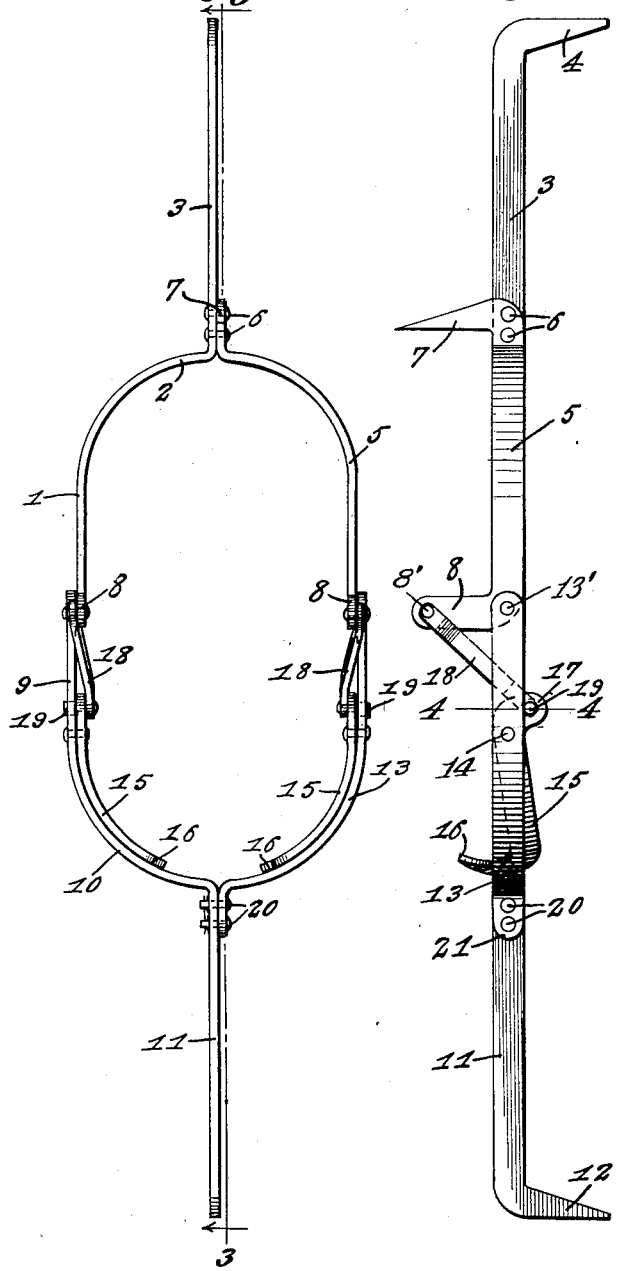
Figure 1 is a front view of the poke which forms the subject matter of the present invention.
Figure 2 is a side view thereof.
Figure 3 is a sectional view taken approximately on line 3—3 of Figure 1, looking in the direction of the arrows.
Figure 4:
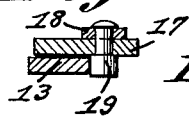
Figure 4 is a sectional view taken approximately on line 4—4 of Figure 2, looking in the direction of the arrows.

Referring to the drawing in detail, it will be noted that my poke or yoke is made entirely from metal and includes a pair of pivoted sections, one of which is made up of a bar 1 that is curved for a portion of its length as at 2 and thence extends upwardly to provide an arm 3, which terminates in a forwardly directed hook 4. Secured to the bar 1 at the juncture of the curved portion with the arm 3 is a bar 5, through the instrumentality of rivets 6 or other like securing means and the bar 5 has extending at right angles from its upper and a spur 7 for a purpose which will be later described.

The lower ends of the bars 1 and 5 are bent at right angles upon themselves to provide arm 8.

The other section which may be termed the lower section includes a bar 9 that likewise is provided with a curved portion 10 that extends into a vertical arm 11, the latter having formed with its lower end a hook 12, and secured to the arm 11 at its juncture with the curved portion is a bar 13 and is curved for a portion of its length. The upper end of the bars 9 and 13 are pivotally secured to the lower ends of the bars 1 and 5, at the juncture of the connection of the short arms 8 with the bars 1 and 5, by pivot pins 13' as best shown in Figures 2 and 3.

It will be noted that each of the bars are provided with curved portions which merge into straight portions, and pivotally secured to the straight portions of the bars 9 and 13 by pivot pins 14 are the shanks 15 of spur members, which are curved to follow the curvature of the curved portions of the bars 9 and 13 and terminate in right angle disposed spurs 16 arranged in the same direction as the spur 7. The upper ends of the shanks 15 have formed therewith forwardly directed ears 17, and pivotally secured to these ears 17 are one of the ends of links 18, while the opposite ends of the links 18 are pivotally secured to the free ends of the short arms 8 by pivot pins 8'.

The pivot pins for the links 18 and the ears 17 are provided with elongated heads 19 on the outer ends thereof for engagement with the bars 9 and 13 so as to prevent the sections from swinging in a forward direction. However, they are freely swingable in a rearward direction.

The bar 13 is detachably secured to the bar 9 and for this purpose I provide bolts 20 having openings therein to accommodate cotter pins as shown in Figure 1. When the poke is applied to the neck of an animal, the bar 13 is sprung outwardly, and the device is then placed upon the animal's neck. The bolts 20 are passed through openings formed in an ear 21 of the bar 13, and openings arranged in the arm 11 and the cotter pins are then placed in bores of the bolts 20 in the usual manner, with the result it will be seen that it is practically impossible for the device to become casually removed from the animal's neck.

From the above description and disclosure of the drawing, it will be obvious that I have provided an animal poke that when pressure is applied to either of the arms 3 and 11, by the hooks 4 and 12 coming in contact with a fence or the like, the sections will be swung on their pivots, and such action will cause the spurs 16 and 7 to contact with the animal, and make it desist in an attempt to break through the enclosure or jump over the same. Very slight movement of the arms 3 or 11 will put the spurs into operation, due to the length of the sections and the spur operating parts, as will be apparent upon inspection of Figures 2 and 3. By employing the heads 19, the sections are movable in one direction only, namely, in the direction for causing the spur members to engage the animal, with the result it is impossible for the spur members to be moved out of a position whereby they can not be movable to engage the animal.

It is thought from the foregoing description that the advantages and novel features of my invention will be readily apparent.

I desire it to be understood that I may make changes in the construction and in the combination and arrangements of the several parts, provided that such changes fall within the scope of the appended claim.

What I claim is:—

An animal poke comprising an upper section and a lower section, each section including bars having inner straight spaced parallel portions, curved portions formed with the outer ends of the straight portions, means fixing the curved portions of the upper section together, means detachably securing the curved portions of the lower section together, means pivotally connecting the straight portions of the respective sections together, arms extending at right angles from the pivoted ends of the straight portions of the upper section, a pair of spurs including shanks curved to follow the curvature of the curved portions of the lower section and pivotally secured thereto, ears formed with the shanks adjacent the pivots thereof, a normally vertical arm for each section and formed with and extending outwardly from the outer ends of the curved portions thereof, hooks formed with the free ends of the normally vertical arms, a single spur formed with and extending at right angles from the upper end of a curved portion of the upper section, and substantially at the juncture of its vertical arm therewith, links having their ends pivotally secured to the ears and the right angled extending arms respectively to move the pair of spurs for cooperation with the single spur upon movement of the sections on their pivots, and means to limit the movement of the sections.

EUGENE KAROLUS.